US012720631B2

(12) United States Patent
Jeong et al.

(10) Patent No.: US 12,720,631 B2
(45) Date of Patent: Aug. 25, 2026

(54) METHOD AND DEVICE FOR PERFORMING RELAXED RADIO RESOURCE MANAGEMENT (RRM) MEASUREMENT IN WIRELESS COMMUNICATION SYSTEM

(71) Applicant: SAMSUNG ELECTRONICS CO., LTD., Suwon-si (KR)

(72) Inventors: Seungbeom Jeong, Suwon-si (KR); Soenghun Kim, Suwon-si (KR); Sangyeob Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 394 days.

(21) Appl. No.: 18/261,642

(22) PCT Filed: Jan. 12, 2022

(86) PCT No.: PCT/KR2022/000578
§ 371 (c)(1),
(2) Date: Jul. 14, 2023

(87) PCT Pub. No.: WO2022/154488
PCT Pub. Date: Jul. 21, 2022

(65) Prior Publication Data

US 2024/0314879 A1 Sep. 19, 2024

(30) Foreign Application Priority Data

Jan. 14, 2021 (KR) ........................ 10-2021-0005315

(51) Int. Cl.
*H04W 76/20* (2018.01)
*H04B 17/318* (2015.01)
*H04W 8/22* (2009.01)

(52) U.S. Cl.
CPC .......... *H04W 76/20* (2018.02); *H04B 17/328* (2023.05); *H04W 8/22* (2013.01)

(58) Field of Classification Search
CPC ......... H04W 76/20; H04W 8/22; H04W 8/24; H04W 24/08; H04B 17/318; H04B 17/328; Y02D 30/70
See application file for complete search history.

(56) References Cited

U.S. PATENT DOCUMENTS

2020/0059810 A1* 2/2020 Harada ................. H04W 24/10
2020/0314868 A1* 10/2020 Tseng ...................... H04W 8/08
(Continued)

FOREIGN PATENT DOCUMENTS

KR 20210039890 A 4/2021
WO 2020222553 A1 11/2020

OTHER PUBLICATIONS

International Search Report and Written Opinion of the International Searching Authority dated Mar. 30, 2022, in connection with International Application No. PCT/KR2022/000578, 11 pages.
(Continued)

*Primary Examiner* — Kwang B Yao
*Assistant Examiner* — Patrick Yipao Pei

(57) ABSTRACT

The present disclosure relates to: a communication technique merging IoT technology with a 5th (5G) generation or pre-5G communication system for supporting a data transmission rate higher than that of a 4th (4G) generation communication system, such as long term evolution (LTE); and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. According to various embodiments of the present disclosure,
(Continued)

a method and a device for a relaxed radio resource management (RRM) measurement in a wireless communication system can be provided.

20 Claims, 9 Drawing Sheets

(56) References Cited

U.S. PATENT DOCUMENTS

| | | | | |
|---|---|---|---|---|
| 2021/0227451 | A1* | 7/2021 | Babaei | H04W 48/10 |
| 2021/0368529 | A1* | 11/2021 | Sakhnini | H04W 72/23 |
| 2022/0022147 | A1* | 1/2022 | Lei | H04W 56/001 |

OTHER PUBLICATIONS

Oppo, "Discussion on RRM relaxation", R2-2009106, 3GPP TSG-RAN WG2 Meeting #112-e, Nov. 2-13, 2020, 3 pages.

ZTE Corporation et al., "Consideration on RRM relaxation for Redcap UE", R2-2006902, 3GPP TSG-RAN WG2 Meeting #111-e, Aug. 17-28, 2020, 5 pages.

VIVO et al., "RRM Relaxation for Power Saving", R2-2009087, 3GPP TSG-RAN WG2 Meeting #112-e, Nov. 2-13, 2020, 10 pages.

* cited by examiner

FIG. 1A 1a-05
AMF
1a-10
gNB
1a-20
1a-15
NR UE
1a-25
MME
1a-30
eNB
1a-35

FIG. 1C

FIG. 1I 1i-30 Backhaul communication unit 1i-50 Controller 1i-52 Multi-connection processor 1i-40 Storage unit 1i-20 Baseband processor 1i-10 RF processor

METHOD AND DEVICE FOR PERFORMING RELAXED RADIO RESOURCE MANAGEMENT (RRM) MEASUREMENT IN WIRELESS COMMUNICATION SYSTEM

TECHNICAL FIELD

The disclosure relates to operations of a UE and a base station.

BACKGROUND ART

To meet the increasing demand for wireless data traffic since the deployment of $4^{th}$ generation (4G) communication systems, efforts have been made to develop an improved $5^{th}$ generation (5G) or pre-5G communicate ion system. Therefore, the 5G or pre-5G communication system is also called a "beyond 4G network" communication system or a "post long term evolution (LTE) system".

Implementation of the 5G communication system in ultra-high frequency (mmWave) bands, e.g., 60 GHz bands, is being considered in order to accomplish high data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced s mall cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQA M) and sliding window superposition coding (SWSC), as advanced coding modulation (ACM) systems, and filter bank multi carrier (FBMC), n on-orthogonal multiple access (NOMA), and sparse code multiple access (SCMA), as advanced access technologies, have been developed.

The 5G system is considering support for various services as compared to the existing 4G system. For example, the most representative services may be an enhanced mobile broad band (eMBB), ultra-reliable and low latency communication (URLLC), massive machine type communication (mMTC), evolved multimedia broadcast/multicast service (eMBMS), and the like. Further, a system that provides the URLLC service may be c alled an URLLC system, and a system that provides the eMBB service may be called an eMBB system. Further, the terms "service" and "system" may be interchangeably used.

Among the above services, the URLLC service is a service that is newly being considered in the 5G system unlike the existing 4G system, and as compared to other services, it requires satisfaction of conditions of ultra-high reliability (e.g., packet error rate of about $10^{-5}$) and low latency (e.g., about 0.5 msec). In order to satisfy such severe requirements, the URLLC service may require application of a transmission time interval (TTI) that is shorter than that of the eMBB service, and various operation methods utilizing this have been considered.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched.

Such an IoT environment may provide intelligent Internet technology (I T) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications. In line with this, various attempts have been made to apply 5G communication systems to IoT networks. For example, technologies such as a sensor network, machine-to-machine (M2M) communication, and machine type communication (MTC) may be implemented by techniques of beam forming, MIMO, and array antennas, which correspond to the 5G communication technology. Application of a cloud radio access network (cloud RAN) as the above-described big data processing technology may also be considered to be an example of convergence between the 5G technology and the IoT technology.

DISCLOSURE OF INVENTION

Technical Problem

One aspect of the disclosure is to provide a method and a device for performing a relaxed radio resource management (RRM) measurement in a wireless communication system. In particular, the method and the device can greatly save energy consumption by enabling a terminal to perform the relaxed RRM measurement not only in an inactive mode or an idle mode but also in a connected mode.

The technical subject matters to be achieved by the disclosure are not limited to those as described above, and other unmentioned technical subject matters will be able to be understood by those of ordinary skill in the art to which the disclosure pertains from the following description.

Solution to Problem

According to an embodiment of the disclosure to solve the above problems, a method performed by a terminal in a wireless communication system may include: receiving, from a base station, a first message including first information for determining whether the terminal is a terminal being able to perform a relaxed radio resource management (RRM) measurement operation in a connected mode; determining whether the terminal is the terminal being able to perform the relaxed RRM measurement operation in the connected mode based the first information; transmitting, to the base station, a second message including second information indicating whether the terminal is the terminal being able to perform the relaxed RRM measurement operation in the connected mode; and receiving, from the base station, a third message including configuration information for the relaxed RRM measurement operation in the connected mode, determined based on the second information.

Further, the first information may include information for determining whether the terminal is a stationary terminal.

Further, the first message may be a radio resource control (RRC) reconfiguration message.

Further, determining may include determining whether the terminal is the terminal being able to perform the relaxed RRM measurement operation in the connected mode based on at least one of a reference signal received power (RSRP) or a reference signal received quality (RSRQ).

Further, according to an embodiment of the disclosure, a method performed by a base station in a wireless communication system may include: transmitting, to a terminal, a first message including first information for determining whether the terminal is a terminal being able to perform a relaxed radio resource management (RRM) measurement operation in a connected mode; receiving, from the terminal, a second message including second information indicating whether the terminal is the terminal being able to perform the relaxed RRM measurement operation in the connected mode, determined based on the first mode; and transmitting, to the terminal, a third message including configuration information for the relaxed RRM measurement operation in the connected mode, determined based on the second information.

Further, according to an embodiment of the disclosure, a terminal in a wireless communication system may comprise: a transceiver; and a controller coupled with the transceiver and configured to: receive, from a base station, a first message including first information for determining whether the terminal is a terminal being able to perform a relaxed radio resource management (RRM) measurement operation in a connected mode, determine whether the terminal is the terminal being able to perform the relaxed RRM measurement operation in the connected mode based the first information, transmit, to the base station, a second message including second information indicating whether the terminal is the terminal being able to perform the relaxed RRM measurement operation in the connected mode, and receive, from the base station, a third message including configuration information for the relaxed RRM measurement operation in the connected mode, determined based on the second information.

Further, according to an embodiment of the disclosure, a base station in a wireless communication system may comprises: a transceiver; and a controller coupled with the transceiver and configured to: transmit, to a terminal, a first message including first information for determining whether the terminal is a terminal being able to perform a relaxed radio resource management (RRM) measurement operation in a connected mode, receive, from the terminal, a second message including second information indicating whether the terminal is the terminal being able to perform the relaxed RRM measurement operation in the connected mode, determined based on the first mode, and transmit, to the terminal, a third message including configuration information for the relaxed RRM measurement operation in the connected mode, determined based on the second information.

Advantageous Effects of Invention

According to an embodiment of the disclosure, it is possible to perform a relaxed radio resource management (RRM) measurement in a wireless communication system, and by enabling a terminal to perform the relaxed RRM measurement not only in an inactive mode or an idle mode but also in a connected mode, it is possible to save energy consumption.

Effects that can be obtained from the disclosure are not limited to the effects as mentioned above, and other unmentioned effects will be able to be clearly understood by those of ordinary skill in the art to which the disclosure pertains from the following description.

BRIEF DESCRIPTION OF DRAWINGS

Figure 1A:
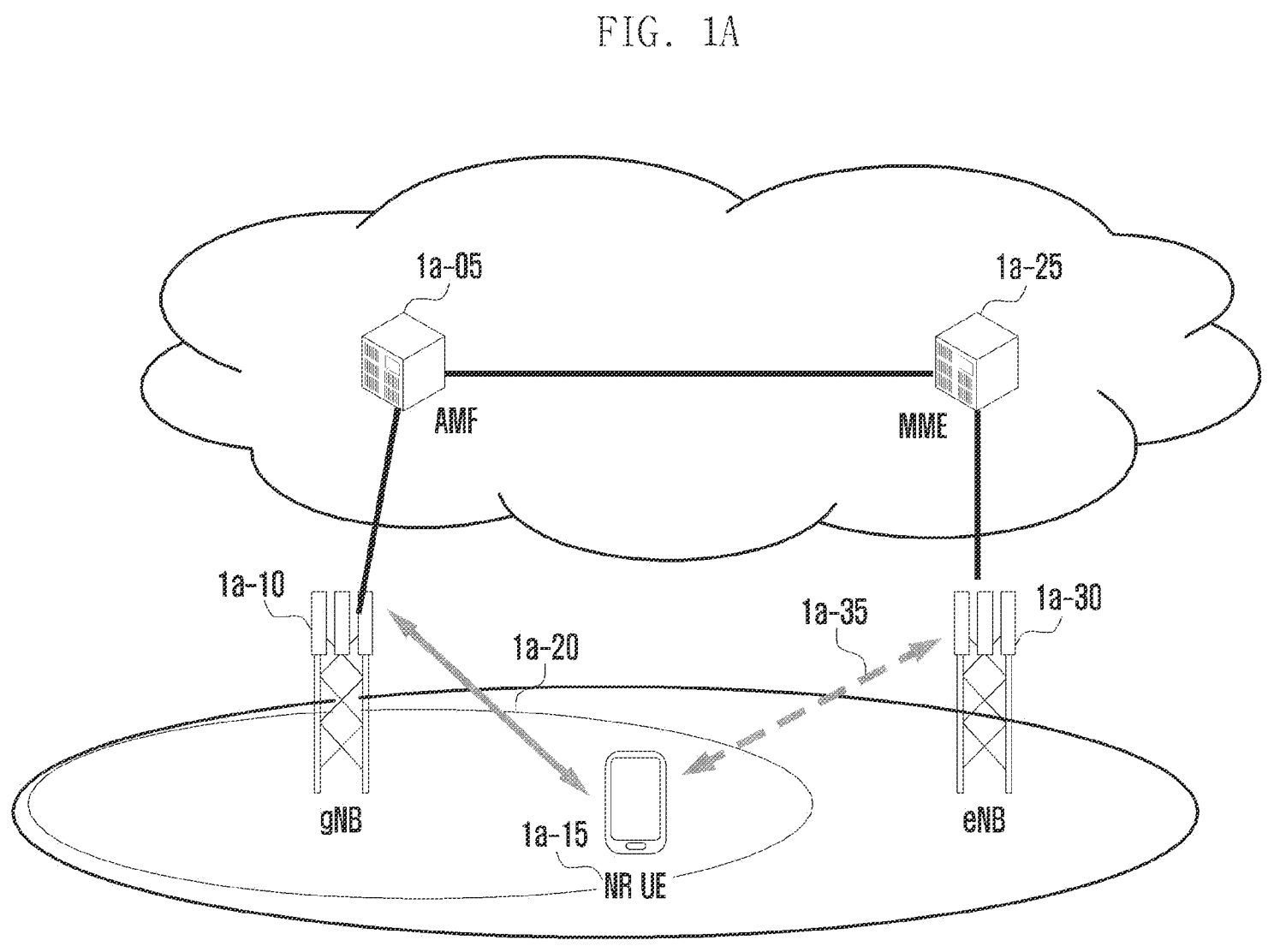

FIG. 1A is a diagram illustrating the structure of a next generation mobile communication system according to an embodiment of the disclosure.

FIG. 1C is a diagram illustrating operation orders in which priority information for each frequency for cell reselection is broadcasted through a system information block (SIB) or is applied to a specific UE through an RRCRelease message that is a dedicated RRC signaling in a next generation mobile communication system according to an embodiment of the disclosure.

FIG. 1I is a block diagram illustrating the constitution of a base station according to an embodiment of the disclosure.

MODE FOR THE INVENTION

Figure 1B:
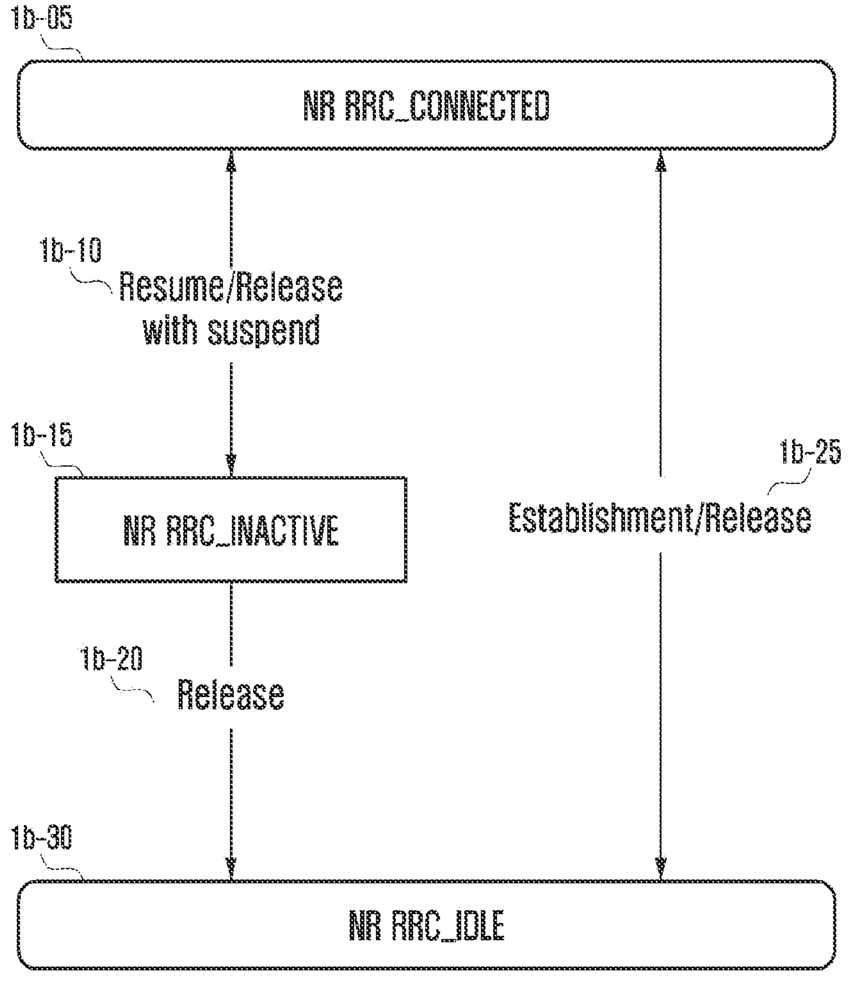
FIG. 1B is a diagram explaining a radio access state transition in a next generation mobile communication system according to an embodiment of the disclosure.

Hereinafter, the principle of operation of the disclosure will be described in detail with reference to the accompanying drawings. In describing the disclosure, a detailed description of related known functions or constitutions will be omitted if it is determined that it obscures the gist of the disclosure unnecessarily. Further, terms to be described later are terms defined in consideration of their functions in the disclosure, and may differ depending on intentions of a user or an operator, or customs. Accordingly, they should be defined based on the contents of the whole description of the disclosure.

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

FIG. 1A is a diagram illustrating the structure of a next generation mob ile communication system according to an embodiment of the disclosure.

With reference to FIG. 1A, a radio access network of a next generation mobile communication system (new radio (NR)) may be composed of a new radio node B (hereinafter, gNB) 1*a*-10 and an access and mobility management entity (AMF, new radio core network) 1*a*-05. A new radio user equipment (hereinafter, NR UE or UE or terminal) 1*a*-15 may access an external network through the gNB 1*a*-10 and the AMF 1*a*-05.

In FIG. 1A, the gNB 1*a*-10 corresponds to an evolved node B (eNB) 1*a*-30 of the existing LTE system. The gNB 1*a*-10 is connected to the NR UE 1*a*-15 on a radio channel, and thus it can provide a more superior service than the service of the existing node B (1*a*-20). Because all user traffics are serviced on shared channels in the next generation mobile communication system, a device, which performs scheduling through consolidation of state information, such as a buffer state, an available transmission power state, and a channel state of each UE 1*a*-15, is necessary, and the gNB 1*a*-10 takes charge of this. One gNB 1*a*-10 may generally control a plurality of cells. In order to implement ultrahigh-speed data transmission as compared with the existing LTE, the gNB 1*a*-10 may have the existing maximum bandwidth or more, and a beamforming technology may be additionally grafted in consideration of the orthogonal frequency division multiplexing (hereinafter, called "OFDM") as a radio access technology. Further, the next generation mobile communication system may adapt an adaptive modulation & coding (hereinafter, called "AMC") scheme that determines a modulation scheme and a channel coding rate may be applied to match the channel state of the UE 1*a*-15.

The AMF 1*a*-05 may perform functions of mobility support, bearer configuration, and QoS configuration. The AMF 1*a*-05 is a device taking charge of not only UE mobility management for the UE 1*a*-15 but also various kinds of control functions, and may be connected to a plurality of base stations 1*a*-10. Further, the next generation mobile communication system may interwork with the existing LTE system, and the AMF 1*a*-05 may be connected to an MME 1*a*-25 through a network interface. The MME 1*a*-25 may be connected to an eNB 1*a*-30 that is the existing base station. The UE 1*a*-15 supporting an LTE-NR dual connectivity may transmit and receive data to and from not only the gNB 1*a*-10 but also the eNB 1*a*-30 while maintaining connections thereto (1*a*-35).

FIG. 1B is a diagram illustrating a radio access state transition in a next generation mobile communication system according to an embodiment of the disclosure.

With reference to FIG. 1B, the next generation mobile communication system may have three kinds of radio resource control (RRC) states. A connected mode (RRC_CONNECTED) (1*b*-05) may mean a radio access state in which a UE can perform data transmission/reception. A standby mode or an idle mode (RRC_IDLE) (1*b*-30) may mean a radio access state in which the UE monitors whether paging is transmitted to itself. The connected mode (1*b*-05) and the idle mode (1*b*-30) may be the radio access states being applied even to the existing LTE system, and the detailed technology thereof is the same as that of the existing LTE system. In the next generation mobile communication system, an inactive radio access state or an inactive mode (RRC_INACTIVE) (1*b*-15) has been newly defined. In the disclosure, the RRC_INACTIVE radio access state (1*b*-15) newly defined in the next generation mobile communication system may correspond to the inactive radio access state, the INACTIVE mode, and the inactive mode.

In the inactive mode (1*b*-15) radio access state, the UE context may be maintained in the base station and the UE, and radio access network (RAN)-based paging may be supported. The features of the inactive (RRC_INACTIVE) radio access state (1*b*-15) that is the new radio access state may be arranged as follows.

Cell re-selection mobility;

CN-NR RAN connection (both C/U-planes) has been established for UE;

The UE AS context is stored in at least one gNB and the UE;

Paging is initiated by NR RAN;

RAN-based notification area is managed by NR RAN;

NR RAN knows the RAN-based notification area which the UE belongs to;

According to an embodiment, the INACTIVE radio access state may be transitioned to the connected mode (1*b*-15) or the idle mode (1*b*-30) by using a specific procedure. In accordance with a resume process, the mode may be switched from the INACTIVE mode (1*b*-05) to the connected mode (1*b*-05), and the mode may be switched from the connected mode (1*b*-05) to the INACTIVE mode (1*b*-15) by using a release procedure including suspend configuration information (1*b*-10). In the above procedure (1*b*-10), one or more RRC messages may be transmitted and received between the UE and the base station, and the above-described procedure (1*b*-10) may be composed of one or more steps. Further, the mode may be switched from the INACTIVE mode (1*b*-15) to the idle mode (1*b*-30) through a release procedure after the resume process (1*b*-20).

The switching between the connected mode (1*b*-05) and the idle mode (1*b*-30) may be performed in accordance with the existing LTE technology. That is, the mode switching between the connected mode (1*b*-05) and the idle mode (1*b*-30) may be performed through an establishment or release procedure (1*b*-25).

Figure 1C:
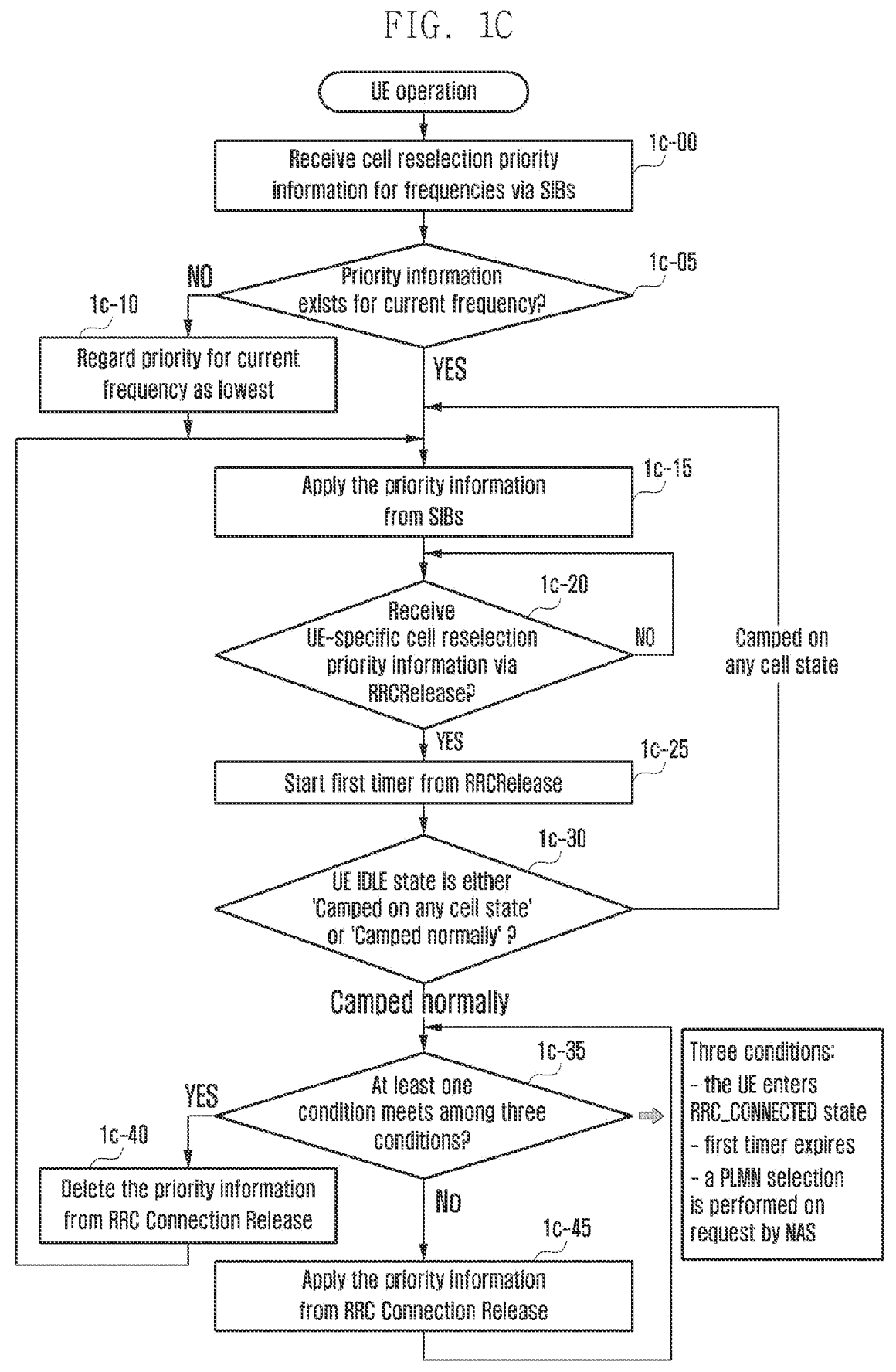

FIG. 1C is a diagram illustrating operation orders in which priority information for each frequency for cell reselection is broadcasted through a system information block (SIB) or is applied to a specific UE through an RRCRelease message that is a dedicated RRC signaling in a next generation mobile communication system according to an embodiment of the disclosure.

With reference to FIG. 1C, cell reselection is a process of reselecting a serving cell so that a moving UE (UE in an RRC_INACTIVE or RRC_IDLE state) can be connected to a cell having the best channel state. A network may control the cell reselection of UEs in an idle mode by giving a priority for each frequency. For example, if one UE has received priority information for two frequencies f1 and f2, and the frequency f1 has a higher priority than the priority of the frequency f2, the probability that the UE stays in the cell having the frequency f1 becomes high. Further, if the channel state of the frequency f2 is not good although the UE is in the cell having the frequency f2, the UE will attempt to change the cell to the cell having the frequency f1.

The priority information for the frequency may be broadcasted through a system information block (SIB), or may be provided to a specific UE through an RRCRelease message that is dedicated RRC signaling. If the UE is provided with UE-specific priority information by RRC signaling through the RRCRelease message although the UE already has the priority information for the frequencies through the SIB, the priority information of the SIB may be disregarded. The priority information for the respective frequencies may be transferred through cellReselectionPriority IE as in Table 1 below, and one of total 8 priority steps may be given. It may mean that as the value becomes lower, the priority becomes lower. That is, "0" may mean the lowest priority.

TABLE 1

```
CellReselectionPriority information element
-- ASN1START
-- TAG-CELLRESELECTIONPRIORITY-START
CellReselectionPriority ::=    INTEGER (0..7)
-- TAG-CELLRESELECTIONPRIORITY-STOP
-- ASN1STOP
```

The frequencies between radio access technologies (RATs) are unable to be given the same priority. If the IDLE state of the UE is the "camped on any cell state", the frequency priority information received through the SIB may be applied, and the priority information received through the RRC signaling may not be used, but may be stored only. The cellReselectionPriority IE is an optional IE, and may not exist. If the cellReselectionPriority IE does not exist, the priority information for the corresponding frequency is not given. In this case, the UE may consider the priority for the corresponding frequency as in the lowest step.

In step 1*c*-00, the UE may be provided with not only priority information for the frequencies being used by not only the NR but also other RATs through the SIB. However, the priority information is not necessarily provided for all frequencies. Also, the priority information for the frequency of a currently camped-on serving cell may not be provided. In step 1*c*-05, the UE may identify this. If the priority information for the frequency of the current serving cell is not provided, the UE may consider the priority for the frequency as in the lowest step like step 1*c*-10. In step 1*c*-15, the UE may apply the priority information for the respective frequencies. If the RRCRelease message is received from the base station, the UE may be switched from the connected mode to the IDLE mode or the INACTIVE mode. The RRC message may include the priority information for the frequencies. This may be UE-specific information, and in general, it may be applied more preferentially than the frequency priority information provided from the SIB. Accordingly, in step 1*c*-20, the UE may identify whether the frequency priority information is present in the RRC message. If the frequency priority information exists in the RRC message, the UE, in step 1*c*-25, may drive a first timer by applying a first timer value included together in the RRC message. In step 1*c*-30, the UE may determine whether the current idle mode state is "camped on any cell state" or "camped normally state". The "camped normally state" calls a state where the UE camps on a suitable cell. The suitable cell is a cell which can provide a normal service to the UE, and is a cell that satisfies the following detailed conditions.

The cell corresponds to a selected public land mobile network (PLMN), a registered PLMN, or one PLMN in an equivalent PLMN list.

Non-barred cell

Cell satisfying the cell selection criterion

The "camped on any cell state" calls a state where the UE is unable to camp on a suitable cell, and camps on an acceptable cell. In the acceptable cell, normal services are not possible, and the UE can attempt only an emergency call. The acceptable cell is a cell that satisfies the following conditions.

Non-barred cell

Cell satisfying the cell selection criterion

If the UE is in the "camped on any cell state" that is the idle state, the UE may not apply the priority information having been provided from the RRCRelease message, but may return to step 1*c*-15 instead, and apply the frequency priority information being provided from the SIB. Further, if the UE is in the "camped normally" state that is the idle state, the UE may determine whether at least one of the following three kinds of conditions is satisfied in step 1*c*-35. The three kinds of conditions are as follows.

The UE is switched to the connected mode.

The first timer expires.

In accordance with a non-access stratum (NAS) request, the PLMN selection process is performed.

If any one of the above conditions is satisfied, the UE may discard the priority information provided from the RRCRelease message in step 1*c*-40, return to step 1*c*-15, and apply the frequency priority information being provided from the SIB. In contrast, if any one of the above conditions is not satisfied, the UE may apply the priority information provided from the RRCRelease message in step 1*c*-45.

The frequency priority information may exert an influence on the UE's measurement of a specific frequency. The UE may always perform the measurement for the frequency having a higher priority than the priority of the current serving cell. In contrast, the UE may not always perform the measurement for the same frequency as the frequency of the serving cell (intra-frequency) or another frequency having the priority that is the same as or lower than that of another frequency in order to save the power.

Whether to perform the measurement may be performed when the channel quality of service (QoS) of the serving cell is equal to or smaller than a specific threshold value. The cell reselection is performed for movement to a cell having a good channel state, and if the channel QoS of the current serving cell is good, there is no reason to move to the frequency having the priority that is the same as or lower than that of the corresponding frequency. Accordingly, whether to perform the measurement may be determined based on the specific threshold value in order to reduce the power consumption due to the unnecessary channel measurement. In case of the same frequency (intra-frequency), if the QoS (e.g., Srxlev or Squal) of the serving cell is the same as or lower than the specific threshold value Sintrasearch (s-IntraSearchP and s-IntraSearchQ), the channel measurement for other cells having the same frequency may be performed. The s-IntraSearchP is a threshold value based on a reference signal received power (RSRP), and the s-IntraSearchQ is a threshold value based on a reference signal received quality (RSRQ). If both the measured RSRP and RSRQ of the serving cell are all larger than the threshold value, the intra-frequency measurement is not performed. In case of another frequency (inter-frequency) having the same or lower priority, if the QoS (e.g., Srxlev or Squal) of the serving cell is the same as or lower than the specific threshold value Snonintrasearch (s-NonIntraSearchP and s-NonIntraSearchQ), the channel measurement for the corresponding cells of other frequencies may be performed. The s-NonIntraSearchP is a threshold value based on the RSRP, and the s-NonIntraSearchQ is a threshold value based on the RSRQ. If both the measured RSRP and RSRQ of the serving cell are all larger than the threshold value, the inter-frequency measurement is not performed.

In the disclosure, through the comparison with the above threshold values, the state of performing the channel measurement through the intra-frequency or inter-frequency is called a normal measurement state, and the state otherwise is called a no measurement state. Regardless of the channel measurement performing state (measurement state), the serving cell measurement may be always performed.

If the channel QoS of the cell for the frequency having a higher priority becomes higher than the specific threshold value ThreshX-high while the measurement is performed, The UE may reselect the cell for the frequency having a higher priority as the serving cell. If the channel QoS of the cell for the frequency having a lower priority is higher than the specific threshold value ThreshX-low, and the QoS of the serving cell becomes lower than the ThreshServing-low, the UE may reselect the cell for the frequency having a lower priority as the serving cell.

Figure 1D:
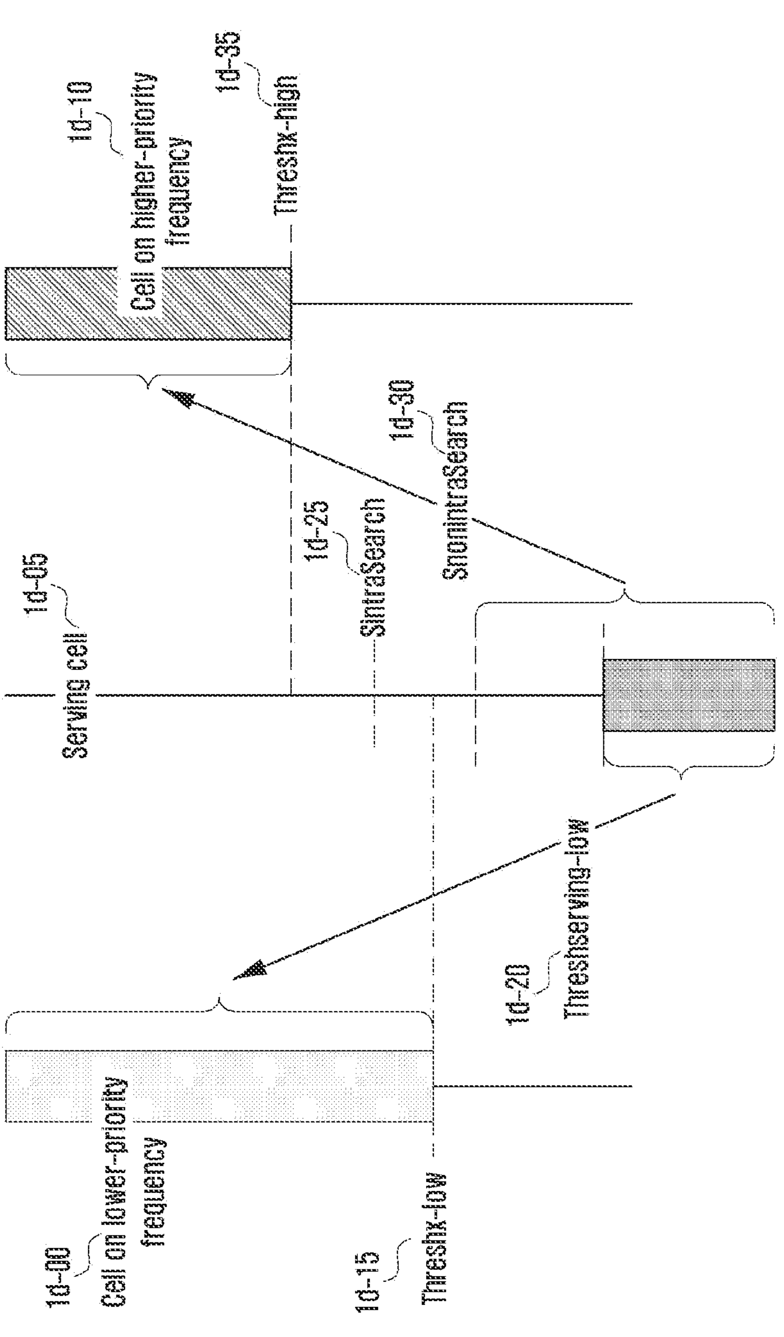
FIG. 1D is a diagram illustrating a method in which a UE performs cell reselection in a next generation mobile communication system according to an embodiment of the disclosure.

FIG. 1D is a diagram illustrating a method in which a UE performs cell reselection in a next generation mobile communication system according to an embodiment of the disclosure.

With reference to FIG. 1D, a UE may always perform an inter-freq measurement and a RAT measurement on a higher-priority frequency or RAT regardless of the measurement signal strength for a serving cell. If the measurement signal strength (1*d*-05) for the serving cell is lower than SintraSearch (1*d*-25), the UE may perform an intra-freq measurement. If the measurement signal strength for the serving cell is lower than SnonintraSearch (1*d*-30), the UE may perform the inter-freq/RAT measurement on the frequency having a priority that is equal to or lower than the priority of the frequency of the current serving cell. The reason why the UE triggers the UE measurement operation is to reduce power consumption of the UE due to the neighboring cell measurement. If a channel QoS of a cell (1*d*-10) on a higher-priority frequency becomes higher than a specific threshold value ThreshX-high (1*d*-35), the UE may reselect the cell on the higher-priority frequency as the serving cell. If the channel QoS of a cell (1*d*-00) on a lower-priority frequency is higher than a specific threshold value ThreshX-low (1*d*-15), and the QoS of the serving cell becomes lower than ThreshServing-low (1*d*-20), the UE may reselect the cell on the lower-priority frequency as the serving cell.

During the cell reselection, the reference signal received power (RSRP) or the reference signal received quality (RSRQ) may be considered. For them, Srxlev or Squal may be calculated as follows.

$$Srxlev=Q_{rxlevmeas}-(Q_{rxlevmin}+Q_{rxlevminoffset})-P_{compenation}-Q_{offsettemp}$$

$$Squal=Q_{qalmeas}-(Q_{qualmin}+Q_{qualminoffset})-Q_{offsettemp}$$

Here, the meanings of respective variables are as described in Table 2 below.

TABLE 2

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 [3] (dB) |
| Q__rxlevmeas | Measured cell RX level value (RSRP) |
| Q__qualmeas | Measured cell quality value (RSRQ) |
| Q__rxlevmin | Minimum required RX level in the cell (dBm). If the UE supports SUL frequency for this cell, Q__rxlevmin is obtained from q-RxLevMinSUL, if present, in SIB1, SIB2 and SIB4, additionally, if Q__rxlevminoffsetcellSUL is present in SIB3 and SIB4 for the concerned cell, this cell specific offset is added to the corresponding Qrxlevmin to achieve the required minimum RX level in the concerned cell;<br>else Q__rxlevmin is obtained from q-RxLevMin in SIB1, SIB2 and SIB4, additionally, if Q__rxlevminoffsetcell is present in SIB3 and SIB4 for the concerned cell, this cell specific offset is added to the corresponding Qrxlevmin to achieve the required minimum RX level in the concerned cell. |
| Q__qualmin | Minimum required quality level in the cell) (dB). Additionally, if Q__qualminoffsetcell is signaled for the concerned cell, this cell specific offset is added to achieve the required minimum quality level in the concerned cell. |
| Q__rxlevminoffset | Offset to the signalled Q__rxlevmin taken into account in the Srxlev evaluation as a result of a periodic search for a higher priority PLMN while camped normally in a VPLMN, as specified in TS 23.122 [9]. |
| Q__qualminoffset | Offset to the signalled Q__qualmin taken into account in the Squal evaluation as a result of a periodic search for a higher priority PLMN while camped normally in a VPLMN, as specified in TS 23.122 [9]. |
| P__compensation | For FR1, if the UE supports the additionalPmax in the NR-NS-PmaxList, if present, in SIB1, SIB2 and SIB4:<br>max(P__EMAX1 − P__PowerClass, 0) − (min(P__EMAX2, P__PowerClass) − min(P__EMAX1, P__PowerClass)) (dB);<br>else:<br>max(P__EMAX1 − P__PowerClass, 0) (dB)<br>For FR2, P__compensation is set to 0. |
| P__EMAX1, P__EMAX2 | Maximum TX power level of a UE may use when transmitting on the uplink in the cell (dBm) defined as $P_{EMAX}$ in TS 38.101 [15]. If UE supports SUL frequency for this cell, P__EMAX1 and P__EMAX2 are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 for normal UL as specified in TS 38.331 [3]. |
| P__PowerClass | Maximum RF output power of the UE (dBm) according to the UE power class as defined in TS 38.101-1 [15]. |

Further, the measurement rules for the cell reselection will be described in detail with reference to TS 38.331 v.16.2.0 as in Table 3 below.

TABLE 3

5.2.4.2 Measurement rules for cell re-selection
Following rules are used by the UE to limit needed measurements:
- If the serving cell fulfils Srxlev > S_IntraSearchP and Squal > S_IntraSearchQ, the UE may choose not to perform intra-frequency measurements.
- Otherwise, the UE shall perform intra-frequency measurements.
- The UE shall apply the following rules for NR inter-frequencies and inter-RAT frequencies which are indicated in system information and for which the UE has priority provided as defined in 5.2.4.1:
- For a NR inter-frequency or inter-RAT frequency with a reselection priority higher than the reselection priority of the current NR frequency, the UE shall perform measurements of higher priority NR inter-frequency or inter-RAT frequencies according to TS 38.133 [8].
- For a NR inter-frequency with an equal or lower reselection priority than the reselection priority of the current NR frequency and for inter-RAT frequency with lower reselection priority than the reselection priority of the current NR frequency:
- If the serving cell fulfils Srxlev > S_nonIntraSearchP and Squal > S_nonIntraSearchQ, the UE may choose not to perform measurements of NR inter-frequencies or inter-RAT frequency cells of equal or lower priority;
- Otherwise, the UE shall perform measurements of NR inter-frequencies or inter-RAT frequency cells of equal or lower priority according to TS 38.133 [8].
- If the UE supports relaxed measurement and relaxedMeasurement is present in SIB2, the UE may further relax the needed measurements, as specified in clause 5.2.4.9.

Figure 1E:
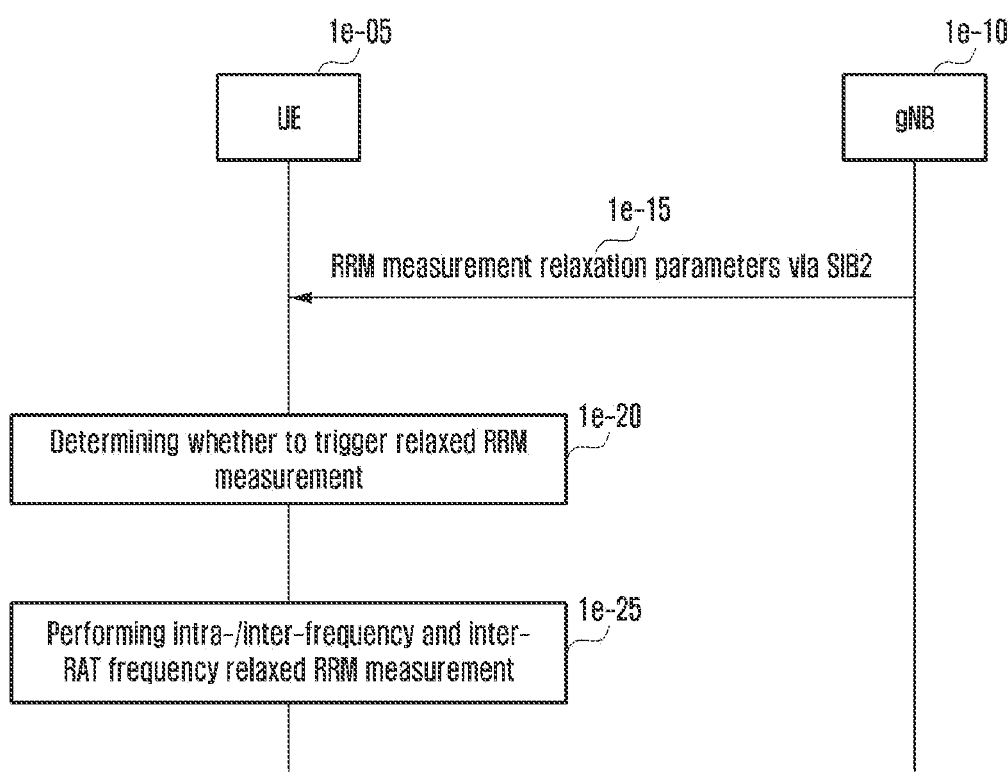
FIG. 1E is a diagram illustrating operation orders of a UE and a base station, which perform a relaxed RRM measurement in new radio (NR) according to an embodiment of the disclosure.

FIG. 1E is a diagram illustrating operation orders of a UE and a base station, which perform a relaxed RRM measurement in new radio (NR) according to an embodiment of the disclosure.

With reference to FIG. 1E, a UE 1*e*-05 having determined to perform an RRM measurement in accordance with FIG. 1D and Table 3 above may identify whether relaxedMeasurement is configured in SIB2 through an RRM measurement relaxation parameter of the SIB2 received from a base station 1*e*-10 (1*e*-15). In the relaxedMeasurement, plural parameters for the RRM relaxation are stored as in some contents of TS 38.331 v.16.2.0 in Table 4 below.

TABLE 4

```
relaxedMeasurement-r16                          SEQUENCE {
     lowMobilityEvaluation-r16                    SEQUENCE {
        s-SearchDeltaP-r16                          ENUMERATED {
                                                         dB3, dB6, dB9,
dB12, dB15,                                              spare3, spare2,
spare1},
        t-SearchDeltaP-r16                        ENUMERATED {
                                                         s5, s10, s20, s30,
s60, s120, s180,
                                                         s240, s300, spare7,
spare6, spare5,                                          spare4, spare3,
spare2, spare1}
     }
OPTIONAL,                          -- Need R
  cellEdgeEvaluation-r16                          SEQUENCE {
        s-SearchThresholdP-r16                      ReselectionThreshold,
        s-SearchThresholdQ-r16                          ReselectionThresholdQ
OPTIONAL                           -- Need R
  }
OPTIONAL,                          -- Need R
     combineRelaxedMeasCondition-r16                  ENUMERATED {true}
OPTIONAL,                          -- Need R
     highPriorityMeasRelax-r16                        ENUMERATED {true}
OPTIONAL                             -- Need R
  }
OPTIONAL                             -- Need R
  ]]
```

If the relaxedMeasurement is configured in SIB2, and the UE 1*e*-05 supports the relaxed measurement, the UE 1*e*-05 determines whether to perform the RRM relaxation by using the parameters (1*e*-20). If it is determined that it is possible to perform the RRM relaxation through 1*e*-20, the UE 1*e*-05 may perform the relaxed RRM measurement (1*e*-25). In step 1*e*-20, two kinds of relaxed measurement criteria may be used, and they are a low mobility criterion and a not-at-cell-edge criterion. The base station 1*e*-10 may configure only one of two criteria, or may configure both of them. Through the low mobility criterion, the UE 1*e*-05 may distinguish the fact that its own mobility level is low, and through the not-at-cell-edge criterion, the UE 1*e*-05 may distinguish that the UE itself is not located at an edge of the serving cell. That is, the UE 1*e*-05 having low mobility and being located in a place that is not the cell edge is less necessary to perform the cell reselection for another neighboring cell since the signal strength of the serving cell is stable, and thus the UE 1*e*-05 can perform the relaxed RRM measurement for the neighboring cell. The relaxed RRM measurement measures the frequency in a longer period than the period of the normal RRM measurement (e.g., more rarely), and thus the energy consumption can be reduced. The detailed explanation of the low mobility criterion and the not-at-cell-edge criterion may be the same as those of some contents of TS 38.304 v.16.2.0 in Table 5 below.

TABLE 5

5.2.4.9.1 Relaxed measurement criterion for UE with low mobility
The relaxed measurement criterion for UE with low mobility is fulfilled when:
- (Srxlev_Ref − Srxlev) < S_SearchDeltaP,
Where:
- Srxlev = current Srxlev value of the serving cell (dB).
- Srxlev_Ref = reference Srxlev value of the serving cell (dB), set as follows:
- After selecting or reselecting a new cell, or
- If (Srxlev − Srxlev_Ref) > 0, or
- If the relaxed measurement criterion has not been met for T_SearchDeltaP:
- The UE shall set the value of Srxlev_Ref to the current Srxlev value of the serving cell.
5.2.4.9.2 Relaxed measurement criterion for UE not at cell edge
The relaxed measurement criterion for UE not at cell edge is fulfilled when:
- Srxlev > S_SearchThresholdP, and,
- Squal > S_SearchThresholdQ, if S_SearchThresholdQ is configured,
Where:
- Srxlev = current Srxlev value of the serving cell (dB).
- Squal = current Squal value of the serving cell (dB).

Further, the method in which the UE determines/performs the relaxation through 1*e*-20 and 1*e*-25 by using the two criteria may be the same as some contents of TS 38.304 v.16.2.0 in Table 6 and Table 7 below. It will be preferable that Table 6 and Table 7 are understood as the contents connected with each other.

TABLE 6

5.2.4.9.0 Relaxed measurement rules
When the UE is required to perform measurements of intra-frequency or NR inter-frequencies or inter-RAT frequency cells according to the measurement rules in clause 5.2.4.2:
- if lowMobilityEvaluation is configured and cellEdgeEvaluation is not configured; and
- if the UE has performed normal intra-frequency, NR inter-frequency, or inter-RAT frequency measurements for at least T_SearchDeltaP after (re-)selecting a new cell; and
- if the relaxed measurement criterion in clause 5.2.4.9.1 is fulfilled for a period of T_SearchDeltaP:
- the UE may choose to perform relaxed measurements for intra-frequency cells according to relaxation methods in clauses 4.2.2.9 in TS 38.133 [8];
- if the serving cell fulfils Srxley > S_nonIntraSearchP and Squal > S_nonIntraSearchQ:
- for any NR inter-frequency or inter-RAT frequency of higher priority, if less than 1 hour has passed since measurements of corresponding frequency cell(s) for cell (re-)selection were last performed; and,
- if highPriorityMeasRelax is configured with value true:
- the UE may choose not to perform measurement on this frequency cell(s);
- else (i.e. the serving cell fulfils Srxlev ≤ S_nonIntraSearchP or Squal ≤ S_nonIntraSearchQ):
- the UE may choose to perform relaxed measurements for NR inter-frequency or inter-RAT frequency cells according to relaxation methods in clauses 4.2.2.10, and 4.2.2.11 in TS 38.133 [8];
- if cellEdgeEvaluation is configured and lowMobilityEvaluation is not configured; and
- if the relaxed measurement criterion in clause 5.2.4.9.2 is fulfilled:
- the UE may choose to perform relaxed measurements for intra-frequency cells according to relaxation methods in clauses 4.2.2.9 in TS 38.133 [8];
- if the serving cell fulfils Srxlev ≤ S_nonIntraSearchP or Squal ≤ S_nonIntraSearchQ:
- the UE may choose to perform relaxed measurements for NR inter-frequency or inter-RAT frequency cells according to relaxation methods in clauses 4.2.2.10, and 4.2.2.11 in TS 38.133 [8];

TABLE 7

| |
|---|
| - if both lowMobilityEvaluation and cellEdgeEvaluation are configured: |
| - if the UE has performed normal intra-frequency, NR inter-frequency, or inter-RAT frequency measurements for at least T_SearchDeltaP after (re-)selecting a new cell; and |
| - if the relaxed measurement criterion in clause 5.2.4.9.1 is fulfilled for a period of T_SearchDeltaP; and |
| - if the relaxed measurement criterion in clause 5.2.4.9.2 is fulfilled: |
| - for any intra-frequency, NR inter-frequency, or inter-RAT frequency, if less than 1 hour has passed since measurements of corresponding frequency cell(s) for cell (re-)selection were last performed: |
| - the UE may choose not to perform measurement for measurements on this frequency cell(s); |
| - else: |
| - if the UE has performed normal intra-frequency, NR inter-frequency, or inter-RAT frequency measurements for at least T_SearchDeltaP after (re-)selecting a new cell, and the relaxed measurement criterion in clause 5.2.4.9.1 is fulfilled for a period of T_SearchDeltaP; or, |
| - if the relaxed measurement criterion in clause 5.2.4.9.2 is fulfilled: |
| - if combineRelaxedMeasCondition is not configured: |
| - the UE may choose to perform relaxed measurements for intra-frequency, NR inter-frequency cells of equal or lower priority, or inter-RAT frequency cells of equal or lower priority according to relaxation methods in clauses 4.2.2.9, 4.2.2.10, and 4.2.2.11 in TS 38.133 [8]; |
| - if the serving cell fulfils Srxlev ≤ S_nonIntraSearchP or Squal ≤ S_nonIntraSearchQ: |
| - the UE may choose to perform relaxed measurement for NR inter-frequency cells of higher priority, or inter-RAT frequency cells of higher priority according to relaxation methods in clauses 4.2.2.10, and 4.2.2.11 in TS 38.133 [8]; |
| The above relaxed measurements and no measurement are not applicable for frequencies that are included in VarMeasIdleConfig, if configured and for which the UE supports dual connectivity or carrier aggregation between those frequencies and the frequency of the current serving cell. |

Figure 1F:
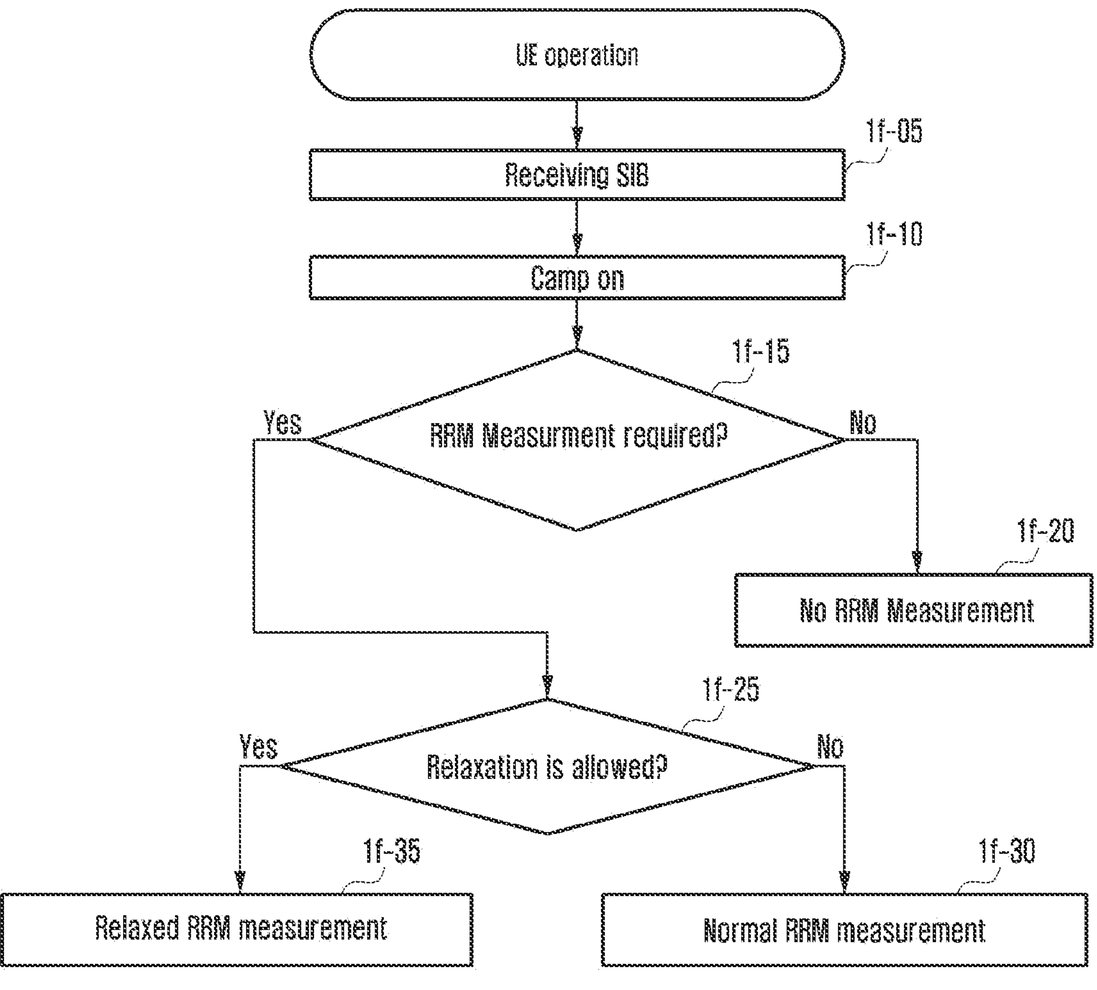
FIG. 1F is a diagram illustrating one embodiment in which a UE selects normal measurement or relaxed measurement in NR according to an embodiment of the disclosure.

FIG. 1F is a diagram illustrating one embodiment in which a UE selects normal measurement or relaxed measurement in NR according to an embodiment of the disclosure.

With reference to FIG. 1F, the UE may receive the SIB, and acquire information for the RRM measurement relaxation (relaxedMeasurement) (**1*f*-05**).

The UE may camp on one serving cell (**1*f*-10**).

The UE may determine whether the RRM measurement for cell reselection is necessary for each frequency (NR intra frequency or NR inter frequency or inter-RAT frequency) or for each frequency priority (**1*f*-15). The operation for 1*f*-15 has been described in detail in the description regarding FIGS. 1C and 1**D and Table 3.

If the specific condition is not satisfied in step **1*f*-15, the UE may not perform the RRM measurement at the corresponding frequency (1*f*-20). If the specific condition is satisfied in step 1*f*-15, the UE may determine whether the RRM measurement relaxation is possible at the corresponding frequency (1*f*-25). The detailed operation about 1*f*-25 has been described in the description regarding FIG. 1**E.

If the specific relaxation condition is not satisfied, the UE may perform the normal RRM measurement at the corresponding frequency (**1*f*-30). The measurement period for the normal measurement may be the same as the contents of TS 38.133. If the specific relaxation condition is satisfied, the UE may perform the relaxed RRM measurement (1*f*-35**). In this case, the UE can reduce the energy consumption by performing the measurement with a larger value than the normal measurement period (e.g., more rarely). The measurement period for the relaxed measurement may be the same as some contents of TS 38.133 and TS 38.304.

In the disclosure, a method for RRM measurement relaxation that is performed by a reduced capability (RedCap) UE in the connected mode (RRC_CONNECTED) in the NR is proposed. The above-described Rel-16 R RM measurement relaxation is the technology to relax the measurement for the cell reselection of the UE in the inactive mode (RRC_INACTIVE) or IDLE mode (RRC_IDLE). In the disclosure, the RRM measurement relaxation method of the UE in the connected mode is proposed, and further, the UE may be a reduced capability (RedCap) device. As the use-case of the NR, an industrial sensor network and video surveillance may be assumed, and most UEs being used in this place may operate at fixed locations. Further, a wearable device can maintain a stationary state for a long time. The important features of the applications are the small size of the UE as compared with normal UEs and the small physical size of the battery. Nevertheless, the UE in the application may require driving for a long time (several days to several years) without battery charging. For example, in case of the industrial sensor network, a great number of UEs are installed for factory automation and event detection, and considerable expense may be required for frequent charging of the great number of UEs. Such UEs are called the reduced capability (RedCap) UEs. Accordingly, such RedCap UEs require greater energy savings as compared with the existing NR UEs. Accordingly, if it is possible for the UE to perform the RRM measurement relaxation not only in the inactive mode or the idle mode but also in the connected mode, the energy consumption can be greatly saved.

The disclosure can be applied to not only RedCap UEs but also all NR or LTE UEs. Further, a condition for the RRM measurement relaxation in the disclosure, a procedure for performing the RRM measurement relaxation, and the RRM measurement relaxation method may be used for measurement relaxation of the UE in not only the connected mode but also the inactive mode or the idle mode.

Figure 1G:
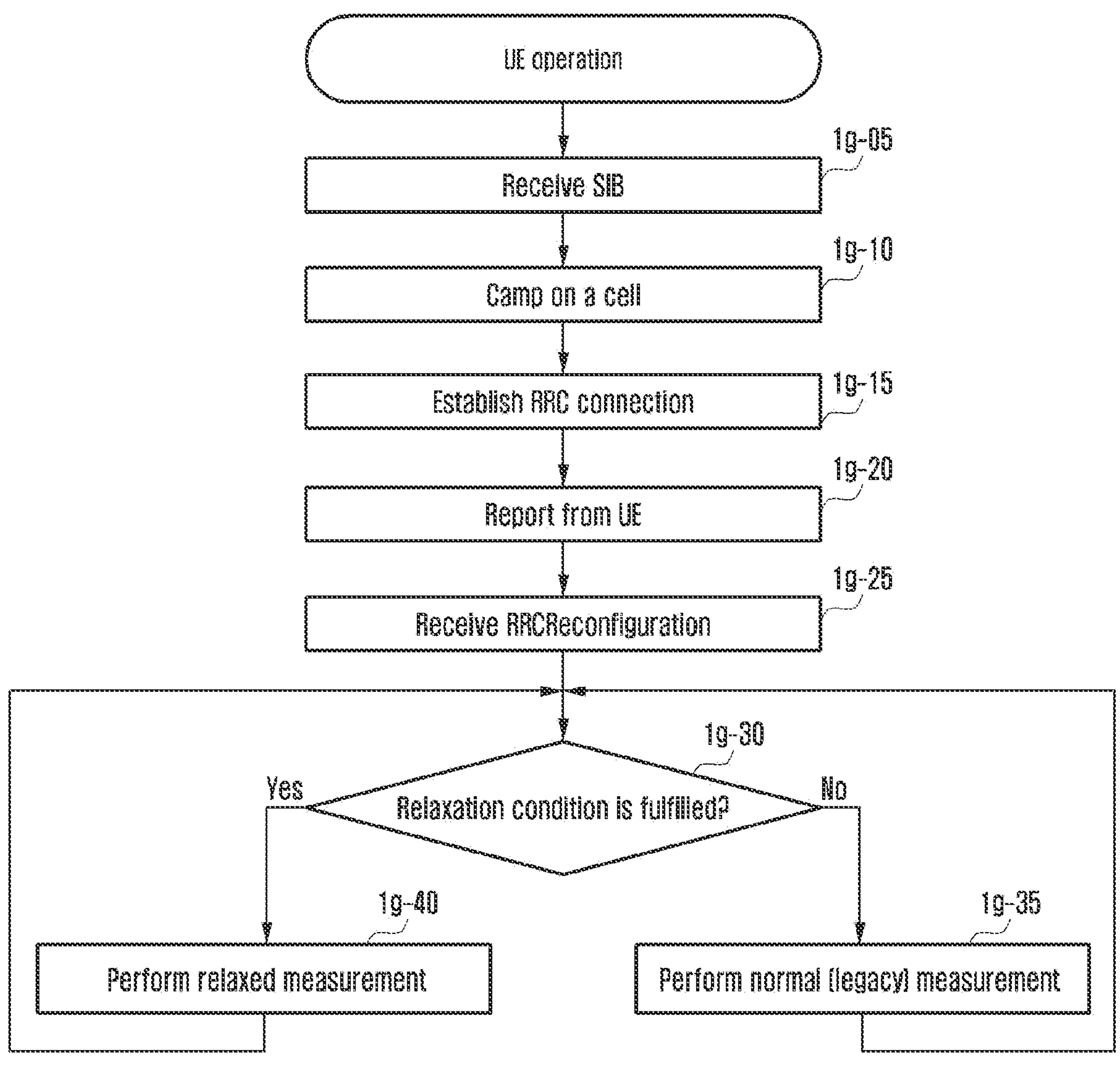
FIG. 1G is a diagram illustrating an operation order in which a reduced capability (RedCap) UE performs measurement as an embodiment of the disclosure.

FIG. 1G is a diagram illustrating an operation order in which a reduced capability (RedCap) UE performs measurement as an embodiment of the disclosure.

With reference to FIG. 1G, a UE may receive relaxation parameters in the connected mode together with Rel-16 relaxation parameters in the inactive mode or the idle mode through system information (i.e., SIB) (1*g*-05). In the same form as that of the Rel-16 relaxation parameter represented in Table 4, in the SIB, the relaxation parameters in the connected mode may be separately provided like the relaxedMeasurement_connected in Table 8 below.

TABLE 8

```
relaxedMeasurement-r16                                      SEQUENCE {
    lowMobilityEvaluation-r16                                   SEQUENCE {
        s-SearchDeltaP-r16                                          ENUMERATED {
                                                                        dB3, dB6, dB9,
dB12, dB15,                                                             spare3, spare2,
spare1},
        t-SearchDeltaP-r16                                          ENUMERATED {
                                                                        s5, s10, s20, s30,
s60, s120, s180,
                                                                        s240, s300, spare7,
spare6, spare5,
                                                                        spare4, spare3,
spare2, spare1}
    }
OPTIONAL,                                   -- Need R
    cellEdgeEvaluation-r16                                      SEQUENCE {
        s-SearchThresholdP-r16                                      ReselectionThreshold,
        s-SearchThresholdQ-r16                                          ReselectionThresholdQ
OPTIONAL                                    -- Need R
  }
OPTIONAL,                                   -- Need R
    combineRelaxedMeasCondition-r16                                 ENUMERATED {true}
OPTIONAL,                                   -- Need R
    highPriorityMeasRelax-r16                                       ENUMERATED {true}
OPTIONAL,                                   -- Need R
  }
OPTIONAL,                                   -- Need R
relaxedMeasurementconnected-r17                                 SEQUENCE {
    lowMobilityEvaluation_connected-r17                             SEQUENCE {
        s-SearchDeltaP_connected-r17
ENUMERATED {
                                                                        dB3, dB6, dB9,
dB12, dB15,
                                                                        spare3, spare2,
spare1},
        t-SearchDeltaP_connected-r17
ENUMERATED {
                                                                        s5, s10, s20, s30,
s60, s120, s180,
                                                                        s240, s300, spare7,
spare6, spare5,
                                                                        spare4, spare3,
spare2, spare1 }
    }
OPTIONAL,                                   -- Need R
    cellEdgeEvaluation_connected-r17                                SEQUENCE {
        s-SearchThresholdP_connected-r17
ReselectionThreshold,
        s-SearchThresholdQ_connected-r17
ReselectionThresholdQ                                           OPTIONAL        -- Need R
    }
OPTIONAL,                                   -- Need R
    combineRelaxedMeasCondition_connected-r17                           ENUMERATED
{true}                                                        OPTIONAL,       -- Need R
    highPriorityMeasRelax-r16_connected-r17                             ENUMERATED
{true}                                                        OPTIONAL        -- Need R
  }
OPTIONAL                                    -- Need R
  ]]
```

A newly defined relaxation parameter (i.e., relaxedMeasurement_connected), a connected relaxation criterion by the intrinsic parameter, and whether to perform the corresponding relaxation may be the same as those of Rel.16 legacy. Further, the base station may request stationary information from the UE through the SIB (1*g*-05). For this, a 1-bit indicator may be introduced. This indicator is described in 1*g*-20.

After camping on the cell (1*g*-10), the UE may be transitioned to the connected mode by configuring the RRC connection (1*g*-15).

If the base station requests the stationary information from the UE through the SIB, the UE may report the following information to the base station through an msg5, UECapabilityInformation, or RRC message (1*g*-20), and the information may include some of the followings.

1. Whether the UE is a stationary device as an intrinsic characteristic (inherent characteristic) of the UE
2. Whether the UE is a slightly moving device as an intrinsic characteristic (inherent characteristic) of the UE
3. Whether the UE is a stationary device through the measurement 4. Whether the UE is a slightly moving device through the measurement
5. Whether the UE supports the stationary RRM relaxation In case of 1 and 2, it may be information being provided from a user services identity module (USIM) or an upper layer without the measurement.

In case of 3 and 4, the Rel-16 low-mobility criterion may be reused for each case, but be acquired by using other s-SearchDeltaP or t-SearchDeltaP values.

Based on the information reported by the UE, the base station may provide the RRM relaxation parameter to the UE in a dedicate manner (e.g., through RRCReconfiguration) (1*g*-25). In this case, the provided parameter is a value for configuring the dedicate relaxation condition to the UE, and may be the same as the relaxedMeasurement_connected represented in Table 8. That is, the relaxation condition parameter may not be transferred through the SIB, but may be transferred in a dedicate manner. The base station may configure the parameter suitable to the UE in accordance with the information reported by the UE, and may store different contents depending on whether the reported information is the stationary device or the slightly moving device.

Further, the RRCReconfiguration message may include parameters for a relaxed measurement performing method (1*g*-25). The above information may be one of the followings.

1) A value designating a relaxed measurement interval
2) A multiple of the existing measurement interval
3) Relaxed measurement object list The measurement object is a parameter that provides information on which object the UE in the connected mode should measure, and the measurement object may include a frequency/time location that should be measured and a subcarrier spacing of reference signals. In order to configure a new measurement object to the UE, the base station may include and configure, to the UE, a list (measObjectToAddModList in Table 9) including an RRCReconfiguration, an R R C R e su m e message, and a plurality of measurement objects in MeasConfig. The UE having received this may perform the measurement on the measurement objects. In contrast, in order to delete the measurement object of the UE, the base station may include and configure, to the UE, a list (measObjectToRemoveList in Table 9) including an RRCReconfiguration and a plurality of measurement objects in the MeasConfig in the RRCResume message. The UE having received this may not perform the measurement any more on the measurement objects.

TABLE 9

```
MeasConfig ::=                                         SEQUENCE {
    measObjectToRemoveList                                 MeasObjectToRemoveList
OPTIONAL,                            -- Need N
    measObjectToAddModList                                 MeasObjectToAddModList
OPTIONAL,                            -- Need N
    reportConfigToRemoveList                               ReportConfigToRemoveList
OPTIONAL,                            -- Need N
    reportConfigToAddModList                               ReportConfigToAddModList
OPTIONAL,                            -- Need N
    measIdToRemoveList                                     MeasIdToRemoveList
OPTIONAL,                            -- Need N
    measIdToAddModList                                     MeasIdToAddModList
OPTIONAL,                            -- Need N
    s-MeasureConfig                                    CHOICE {
      ssb-RSRP                                           RSRP-Range,
      csi-RSRP                                           RSRP-Range
    }
OPTIONAL,                            -- Need M
    quantityConfig                                         QuantityConfig
OPTIONAL,                            -- Need M
    measGapConfig                                          MeasGapConfig
OPTIONAL,                            -- Need M
    measGapSharingConfig                                   MeasGapSharingConfig
OPTIONAL,                            -- Need M
    ...,
    [[
    interFrequencyConfig-NoGap-r16                         ENUMERATED {true}
OPTIONAL                               -- Need R
    ]]
}
```

Proposed in the information 3 (i.e., relaxed measurement object list) is a method for providing a plurality of separate relaxed measurement objects (e.g., measObjectToAddModListRelaxed in Table 10) in order to perform the RRM relaxation together with the measObjectToAddModList. Further, in order to release this, the measObjectToRemoveListRelaxed may be required. That is, if the relaxation condition is not satisfied, the UE may perform the measurement in accordance with the measurement objects by means ofthe measObjectToAd dModList and the measObjectToRemoveList, and if the relaxation condition is satisfied, the UE may perform the measurement in accordance with the measurement objects by means of the measObjectToAddModListRelaxed and measObjectToRemoveListRelaxedM

TABLE 10

```
MeasConfig ::=                                         SEQUENCE {
    measObjectToRemoveList                                 MeasObjectToRemoveList
```

TABLE 10-continued

```
OPTIONAL,                            -- Need N
  measObjectToRemoveListRelaxed                       MeasObjectToRemoveList
OPTIONAL,                            -- Need N
    measObjectToAddModList                           MeasObjectToAddModList
OPTIONAL,                            -- Need N
  measObjectToAddModListRelaxed                      MeasObjectToAddModList
OPTIONAL,                            -- Need N
    reportConfigToRemoveList                         ReportConfigToRemoveList
OPTIONAL,                            -- Need N
    reportConfigToAddModList                         ReportConfigToAddModList
OPTIONAL,                            -- Need N
    measIdToRemoveList                               MeasIdToRemoveList
OPTIONAL,                            -- Need N
    measIdToAddModList                               MeasIdToAddModList
OPTIONAL,                            -- Need N
    s-MeasureConfig                              CHOICE {
      ssb-RSRP                                     RSRP-Range,
      csi-RSRP                                     RSRP-Range
    }
OPTIONAL,                            -- Need M
    quantityConfig                                   QuantityConfig
OPTIONAL,                            -- Need M
    measGapConfig                                    MeasGapConfig
OPTIONAL,                            -- Need M
    measGapSharingConfig                             MeasGapSharingConfig
OPTIONAL,                            -- Need M
...,
]]
    interFrequencyConfig-NoGap-r16                   ENUMERATED {true}
OPTIONAL                               -- Need R
    ]]
}
```

Further, the base station may provide the s-MeasureConfigRelaxed to the UE in a dedicate manner (1g-25). As shown in Table 11 below, the base station may provide the s-MeasureConfig through the RRCReconfiguration. The role of the s-MeasureConfig is to perform the measurement in accordance with the measurement objects provided together when the RSRP of the SpCell of the UE is lower than the s-MeasureConfig, and is not to perform the measurement for the provided measurement objects when the RSRP of the SpCell of the UE is higher than the s-MeasureConfig.

TABLE 11

```
MeasConfig ::=                                      SEQUENCE {
  measObjectToRemoveList                              MeasObjectToRemoveList
OPTIONAL,                            -- Need N
  measObjectToAddModList                              MeasObjectToAddModList
OPTIONAL,                            -- Need N
  reportConfigToRemoveList                            ReportConfigToRemoveList
OPTIONAL,                            -- Need N
  reportConfigToAddModList                            ReportConfigToAddModList
OPTIONAL,                            -- Need N
  measIdToRemoveList                                  MeasIdToRemoveList
OPTIONAL,                            -- Need N
  measIdToAddModList                                  MeasIdToAddModList
OPTIONAL,                            -- Need N
  s-MeasureConfig                                   CHOICE {
    ssb-RSRP                                          RSRP-Range,
    csi-RSRP                                          RSRP-Range
OPTIONAL,                            -- Need M
  quantityConfig                                      QuantityConfig
OPTIONAL                             -- Need M
  measGapConfig                                       MeasGapConfig
OPTIONAL,                            -- Need M
  measGapSharingConfig                                MeasGapSharingConfig
OPTIONAL,                            -- Need M
  ...,
  ]]
  interFrequencyConfig-NoGap-r16                      ENUMERATED {true}
OPTIONAL                               -- Need R
  ]]
}
```

Here, proposed is for the base station to provide the s-MeasureConfigRelaxed separately from the conventional s-MeasureConfig as in Table 12 below. The UE having received the two values may perform the following operation.

In case of s-MeasureConfig<=NR SpCell RSRP, the measurement is not performed for the object.

In case of s-MeasureConfigRelaxed<=NR SpCell RSRP<s-MeasureConfig, the relaxed measurement is performed for the measurement object.

In case of NR SpCell RSRP<s-MeasureConfigRelaxed, the normal measurement is performed for the measurement object.

TABLE 12

```
MeasConfig ::=                                    SEQUENCE {
  measObjectToRemoveList                                  MeasObjectToRemoveList
OPTIONAL,                      -- Need N
  measObjectToAddModList                                  MeasObjectToAddModList
OPTIONAL,                      -- Need N
  reportConfigToRemoveList                                ReportConfigToRemoveList
OPTIONAL,                      -- Need N
  reportConfigToAddModList                                ReportConfigToAddModList
OPTIONAL,                      -- Need N
  measIdToRemoveList                                      MeasIdToRemoveList
OPTIONAL,                      -- Need N
  measIdToAddModList                                      MeasIdToAddModList
OPTIONAL,                      -- Need N
  s-MeasureConfig                                   CHOICE {
    ssb-RSRP                                          RSRP-Range,
    csi-RSRP                                          RSRP-Range
OPTIONAL,                      -- Need M
 s-MeasureConfigRelaxed                               CHOICE {
    ssb-RSRP                                          RSRP-Range,
    csi-RSRP                                          RSRP-Range
  }
OPTIONAL,                      -- Need M
  quantityConfig                                          QuantityConfig
OPTIONAL,                      -- Need M
  measGapConfig                                           MeasGapConfig
OPTIONAL,                      -- Need M
  measGapSharingConfig                                    MeasGapSharingConfig
OPTIONAL,                      -- Need M
  ...,
  [[
  interFrequencyConfig-NoGap-r16                          ENUMERATED {true}
OPTIONAL                         -- Need R
  ]]
}
```

If the base station separately transmits the relaxedMeasurement_connected through the SIB or a dedicate message in accordance with Table 8, the UE may determine whether to perform the relaxed RRM measurement or the normal RRM measurement by checking the relaxation criteria in the same method as that of Rel. 16 legacy (1*g*-30). In this case, if the UE is in the situation of DC/CA, it may average the RSRP/RSRQ values of a plurality of serving cells or select upper values, and may use obtained values in the low-mobility criterion or not-at-cell-edge criterion. Further, the UE may be aware of whether the UE itself is the stationary device from the USIM or upper layer, and thus may distinguish 1*g*-30.

Further, if the base station provides the s-MeasureConfigRelaxed separately from the s-MeasureConfig as in Table 12, the UE having received the two values may perform the following operation.

In case of s-MeasureConfig<=NR SpCell RSRP (1*g*-30), the measurement is not performed for the measurement object.

In case of s-MeasureConfigRelaxed<=NR SpCell RSRP<s-MeasureConfig (1*g*-30), the relaxed measurement is performed for the measurement object.

In case of NR SpCell RSRP<s-MeasureConfigRelaxed (1*g*-30), the normal measurement is performed for the measurement object.

In case that the base station configures the measObjectToAddModListRelaxe d and measObjectToRemoveListRelaxed, if the relaxation condition is not satisfied, the UE may perform the measurement according to the measurement objects by the measObjectToAddModList and measObjectToRemoveList (1*g*-35), whereas if the relaxation condition is satisfied, the UE may perform the measurement in accordance with the measurement objects by means of the measObjectToAddModListRelaxed and measObjectToRemoveListRelaxed (1*g*-4 0).

As another method for the relaxation (1*g*-40), the base station may increase the measurement interval in accordance with the value or the multiple defined in the standards in the same manner as Rel-16. Further, the value or the multiple may be provided from the RRCReconfiguration message in a dedicated manner, and thus the measurement interval may be increased.

As another embodiment of the disclosure, the base station may instruct the UE that performs the relaxed measurement in the connected mode to immediately release the relaxed measurement and to perform the normal measurement. For example, in case of desiring to perform handover the UE to another cell for load balancing, the base station may make the UE search another cell quickly by canceling the relaxed measurement. In the opposite case, the base station may instruct the UE that performs the normal measurement in the connected mode perform the relaxed measurement immediately (e.g., for the purpose of energy saving).

Further, as still another embodiment of the disclosure, the base station may determine whether to perform the RRM measurement relaxation in consideration of the RSRQ.

Figure 1H:
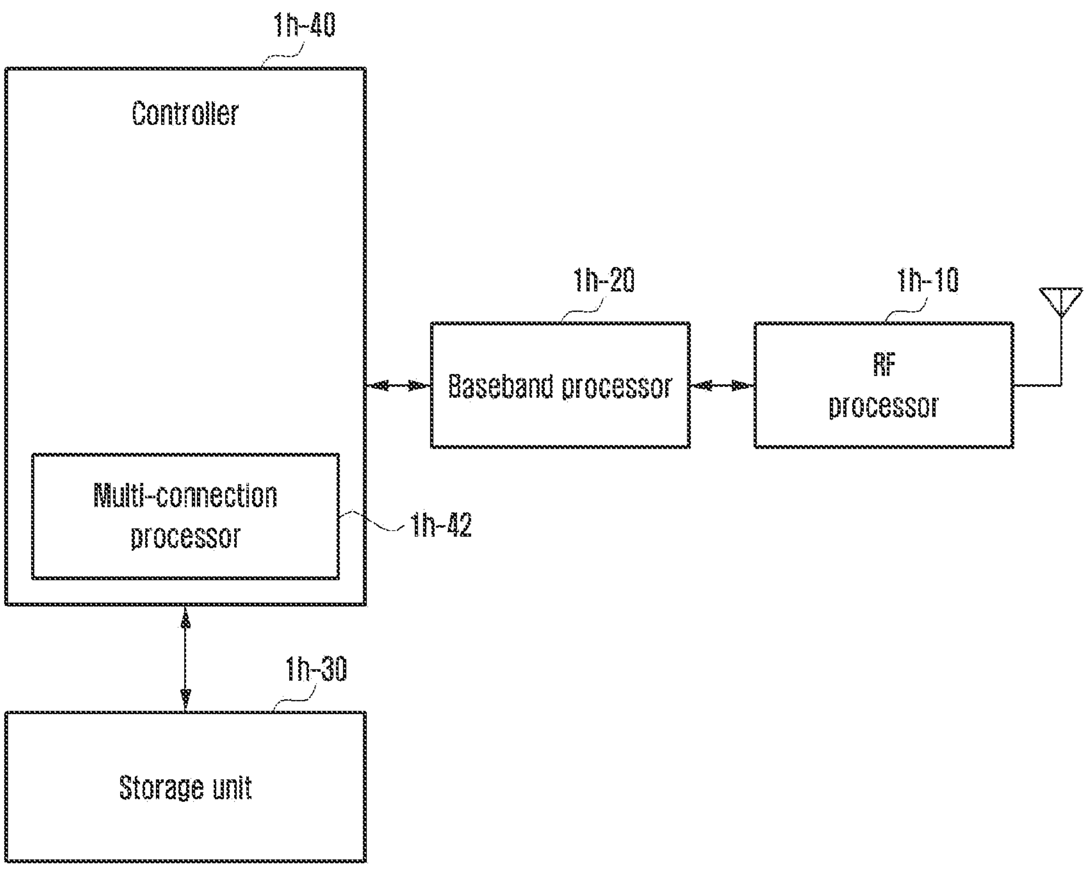
FIG. 1H is a block diagram illustrating the internal structure of a UE according to an embodiment of the disclosure.

FIG. 1H is a block diagram illustrating the internal structure of a UE according to an embodiment of the disclosure.

With reference to FIG. 1H, the UE includes a radio frequency (RF) processor **1*h*-10, a baseband processor 1*h*-20, a storage unit 1*h*-30, and a c ontroller (processor) 1*h*-40**.

The RF processor **1*h*-10 performs a function for transmitting and receiving a signal on a radio channel, such as signal band conversion and amplification. That is, the RF processor 1*h*-10 performs up-conversion of a baseband signal provided from the baseband processor 1*h*-20 into an R F-band signal to transmit the converted signal through an antenna, and performs down-conversion of the RF-band signal received through the antenna into a baseband signal. For example, the RF processor 1*h*-10 may include a transmission filter, a reception filter, an amplifier, a mixer, a n oscillator, a digital-to-analog converter (DAC), and an analog-to-digital converter (ADC). Although only one antenna is illustrated in the drawing, the UE may be provided with a plurality of antennas. Further, the RF processor 1*h*-10 may include a plurality of RF chains. Further, the RF processor 1*h*-10 may perform beamforming. For the beamforming, the RF processor 1*h*-10 may adjust phases and sizes of signals transmitted or received through the plurality of antennas or antenna elements. Further, the RF processor 1*h*-10** may perform MIMO, and may receive several layers during performing of the MIMO operation.

The baseband processor **1*h*-20 performs a conversion function between a baseband signal and a bit string in accordance with the physical layer standard of the system. For example, during data transmission, the baseband processor 1*h*-20 generates complex symbols by encoding and modulating a transmitted bit string. Further, during data reception, the baseband processor 1*h*-20 restores a received bit string by demodulating and de coding the baseband signal provided from the RF processor 1*h*-10. For example, in case of complying with an orthogonal frequency division multiplexing (OFDM) method, during data transmission, the baseband processor 1*h*-20 generates complex symbols by encoding and modulating a transmitted bit string, performs mapping of the complex symbols onto sub carriers, and then configures OFDM symbols through the inverse fast Fourier transform (IFFT) operation and cyclic prefix (CP) insertion. Further, during data reception, the baseband processor 1*h*-20 divides the baseband signal being provided from the RF processor 1*h*-10** in the unit of OFDM symbols, restores the signals mapped onto the subcarriers through the fast Fourier transform (FFT), and then restores the received bit string through demodulation and decoding.

The baseband processor **1*h*-20 and the RF processor 1*h*-10 transmit and receive the signals as described above. Accordingly, the baseband processor 1*h*-20 and the RF processor 1*h*-10 may be called a transmitter, a receiver, a transceiver, or a communication unit. Further, in order to sup port different radio access technologies, at least one of the baseband processor 1*h*-20 and the RF processor 1*h*-10 may include a plurality of communication modules. Further, in order to process signals of different frequency bands, at least one of the baseband processor 1*h*-20 and the R F processor 1*h*-10** may include different communication modules. For ex ample, the different radio access technologies may include a wireless L AN (e.g., IEEE 802.11) and a cellular network (e.g., LTE). Further, the different frequency bands may include super high frequency (SHF) (e.g., 2.NR Hz or NR Hz) band and millimeter (mm) wave (e.g., 60 GHz) band.

The storage unit **1*h*-30 stores therein a basic program for an operation of the UE, application programs, and data of configuration information. In particular, the storage unit 1*h*-30 may store information related to a second access node that performs wireless communication by using a second radio access technology. Further, the storage unit 1*h*-30 provides sto red data in accordance with a request from the controller 1*h*-40**.

The controller **1*h*-40 controls the overall operations of the UE. For example, the controller 1*h*-40 transmits and receives signals through the baseband processor 1*h*-20 and the RF processor 1*h*-10. Further, the controller 1*h*-40 records or reads data in or from the storage unit 1*h*-30. For this, the controller 1*h*-40 may include at least one processor. For example, the controller 1*h*-40** may include a communication processor (CP) that performs a control for communication and an application processor (AP) that controls an upper layer, such as an application program.

Figure 1I:
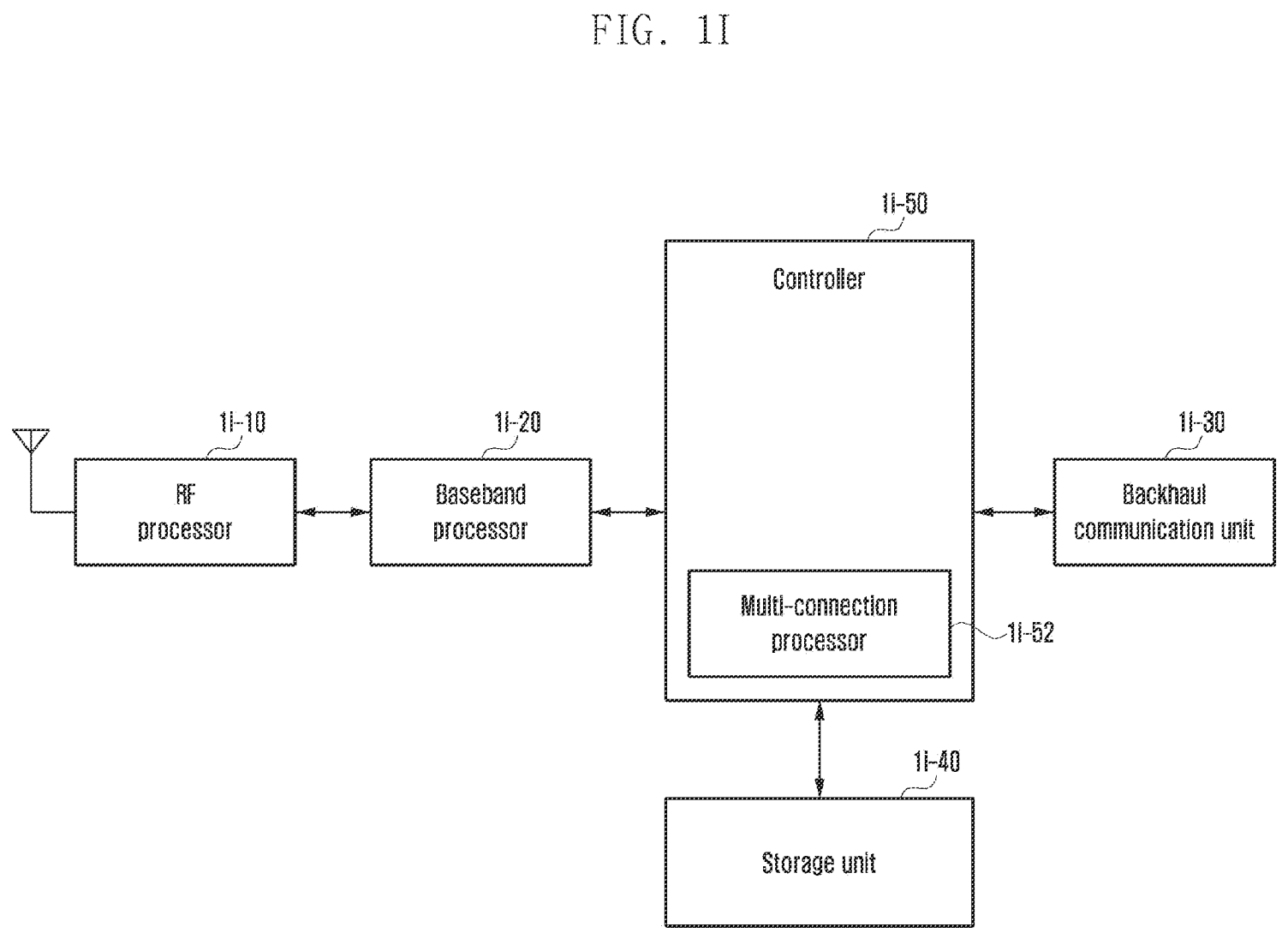

FIG. 1I is a block diagram illustrating the constitution of a base station according to the disclosure.

With reference to FIG. 1I, the base station is configured to include an RF processor **1*i*-10, a baseband processor 1*i*-20, a backhaul communication unit 1*i*-30, a storage unit 1*i*-40, and a controller (processor) 1*i*-50**.

The RF processor **1*i*-10 performs a function for transmitting and receiving signals on a radio channel, such as signal band conversion and amplification. That is, the RF processor 1*i*-10 performs up-conversion of a baseband signal provided from the baseband processor 1*i*-20 into an RF-b and signal to transmit the converted signal through an antenna, and performs down-conversion of the RF-band signal received through the antenna into a baseband signal. For example, the RF processor 1*i*-10 may include a transmission filter, a reception filter, an amplifier, a mixer, an oscillator, a DAC, and an ADC. Although only one antenna is illustrated in the drawing, the first access node may be provided with a plurality of antennas. Further, the RF processor 1*i*-10 may include a plurality of RF chains. Further, the RF processor 1*i*-10 may perform beamforming. For the beamforming, the RF processor 1*i*-10** may adjust phases and sizes of signals being transmitted or received through the plurality of antennas or antenna elements. The RF processor may perform a downward MIMO operation through transmission of one or more layers.

The baseband processor **1*i*-20 performs a conversion function between a baseband signal and a bit string in accordance with the physical layer standard of the first radio access technology. For example, during data transmission, the baseband processor 1*i*-20 generates complex symbols by encoding and modulating a transmitted bit string. Further, during data reception, the baseband processor 1*i*-20 restores a received bit string by demodulating and decoding the baseband signal provided from the RF processor 1*i*-10. For example, in case of complying with an OFDM method, during data transmission, the baseband processor 1*i*-20 generates complex symbols by encoding and modulating a transmitted bit string, performs mapping of the complex symbols to subcarriers, and then configures OFDM symbols through the IFFT operation and CP insertion. Further, during data reception, the baseband processor 1*i*-20 divides the baseband signal provided from the RF processor 1*i*-10 in the unit of OFDM symbols, restores the signals mapped to the subcarriers through the FFT operation, and then restores the received bit string through demodulation and decoding. The baseband processor 1*i*-20 and the RF processor 1*i*-10 transmit and receive the signals as described above. Accordingly, the baseband processor 1*i*-20 and the RF processor 1*i*-10** may be called a transmitter, a receiver, a transceiver, a communication unit, or a wireless communication unit.

The backhaul communication unit **1*i*-30 provides an interface for performing communication with other nodes in the network. That is, the back haul communication unit 1*i*-30** converts a bit string being transmitted fro m the primary base station to other nodes, for example, an auxiliary base station and a core network, into a physical signal, and converts the physical signal being received from other nodes into a bit string.

The storage unit **1*i*-40 stores therein a basic program for an operation of the main base station, application programs, and data of configuration information. In particular, the storage unit 1*i*-40 may store information a bout a bearer allocated to the connected UE and the measurement result reported from the connected UE. Further, the storage unit 1*i*-40 may store information that becomes the basis of determination of whether to provide or suspend a multi-connection to the UE. Further, the storage unit 1*i*-40 provides stored data in accordance with a request from the controller 1*i*-50**.

The controller **1*i*-50 controls the overall operation of the primary base station. For example, the controller 1*i*-50 transmits and receives signals through the baseband processor 1*i*-20 and the RF processor 1*i*-10 or thro ugh the backhaul communication unit 1*i*-30. Further, the controller 1*i*-50 records or reads data in or from the storage unit 1*i*-40. For this, the controller 1*i*-50** may include at least one processor.

In the above-described detailed embodiments of the disclosure, the elements included in the disclosure may be expressed in the singular or plural form depending on the proposed detailed embodiment. However, the singular or plural expression has been selected suitably for a situation pro posed for convenience of description, and the disclosure is not limited to the singular or plural elements. Although an element has been expressed in the plural form, it may be constituted in the singular form, and al though an element has been expressed in the singular form, it may be constituted in the plural form.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The invention claimed is:

1. A method performed by a user equipment (UE) in a wireless communication system, the method comprising:

receiving, from a base station, system information including first relaxation parameters for a stationary reduced capability (RedCap) UE;

transmitting, to the base station, information associated with stationary radio resource management (RRM) relaxation for the stationary RedCap UE in a connected mode; and receiving, from the base station, a radio resource control (RRC) reconfiguration message including second relaxation parameters for the stationary RedCap UE for the connected mode, wherein the first relaxation parameters and the second relaxation parameters are associated with a relaxed RRM measurement.

2. The method of claim 1, wherein the second relaxation parameters are for determining whether the UE is the stationary RedCap UE.

3. The method of claim 1, wherein the second relaxation parameters are s-SearchDeltaP connected and t-SearchDeltaP connected.

4. The method of claim 1, wherein the first relaxation parameters comprise information on a threshold associated with signal strength and fifth-information on a time period associated with a criterion being met.

5. The method of claim 1, further comprising:

transmitting, to the base station, UE capability information indicating whether the UE supports the relaxed RRM measurement for the connected mode.

6. A method performed by a base station in a wireless communication system, the method comprising:

transmitting, to a user equipment (UE), system information including first relaxation parameters for a stationary reduced capability (RedCap) UE;

receiving, from the UE, information associated with stationary radio resource management (RRM) relaxation for the stationary RedCap UE in a connected mode; and transmitting, to the UE, a radio resource control (RRC) reconfiguration message including second relaxation parameters for the stationary RedCap UE for the connected mode, wherein the first relaxation parameters and the second relaxation parameters are associated with a relaxed RRM measurement.

7. The method of claim 6, wherein the second relaxation parameters are for determining whether the UE is the stationary RedCap UE.

8. The method of claim 6, wherein the second relaxation parameters are s-SearchDeltaP connected and t-SearchDeltaP connected.

9. The method of claim 6, wherein the first relaxation parameters comprise information on a threshold associated with signal strength and information on a time period associated with a criterion being met.

10. The method of claim 6, further comprising:

receiving, from the UE, UE capability information indicating whether the UE supports the relaxed RRM measurement for the connected mode.

11. A user equipment (UE) in a wireless communication system, the UE comprising:

a transceiver; and a controller coupled with the transceiver and configured to:

receive, from a base station, system information including first relaxation parameters for a stationary reduced capability (RedCap) UE, transmit, to the base station, information associated with stationary radio resource management (RRM) relaxation for the stationary RedCap UE in a connected mode, and receive, from the base station, a radio resource control (RRC) reconfiguration message including second relaxation parameters for the stationary RedCap UE for the connected mode, wherein the first relaxation parameters and the second relaxation parameters are associated with a relaxed RRM measurement.

12. The UE of claim 11, wherein the second relaxation parameters are for determining whether the UE is the stationary RedCap UE.

13. The UE of claim 11, wherein the second relaxation parameters are s-SearchDeltaP connected and t-SearchDeltaP connected.

14. The UE of claim 11, wherein the first relaxation parameters comprise information on a threshold associated with signal strength and information on a time period associated with a criterion being met.

15. The UE of claim 11, wherein the controller is further configured to:

transmit, to the base station, UE capability information indicating whether the UE supports the relaxed RRM measurement for the connected mode.

16. A base station in a wireless communication system, the base station comprising:

a transceiver; and a controller coupled with the transceiver and configured to:

transmit, to a user equipment (UE), system information including first relaxation parameters for a stationary reduced capability (RedCap) UE, receive, from the UE, information associated with stationary radio resource management (RRM) relaxation for the stationary RedCap UE in a connected mode, and transmit, to the UE, a radio resource control (RRC) reconfiguration message including second relaxation parameters for the stationary RedCap UE for the connected mode, wherein the first relaxation parameters and the second relaxation parameters are associated with a relaxed RRM measurement.

17. The base station of claim 16, wherein the second relaxation parameters are for determining whether the UE is the stationary RedCap UE.

18. The base station of claim 16, wherein the second relaxation parameters are s-SearchDeltaP connected and t-SearchDeltaP connected.

19. The base station of claim 16, wherein the first relaxation parameters comprise information on a threshold associated with signal strength and information on a time period associated with a criterion being met.

20. The base station of claim 16, the controller is further configured to:

receive, from the UE, UE capability information indicating whether the UE supports the relaxed RRM measurement for the connected mode.

* * * * *